United States Patent
D'Amico et al.

[19]

[11] Patent Number: 5,956,020
[45] Date of Patent: *Sep. 21, 1999

[54] TOUCHSCREEN CONTROLLER WITH PEN AND/OR FINGER INPUTS

[75] Inventors: Vincent E. D'Amico, Burlington; Jay J. Gehrig, Westford; Joseph E. Surprenant, Dracut; Steven R. Robsky, Sutton, all of Mass.

[73] Assignee: MicroTouch Systems, Inc., Methuen, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/508,343

[22] Filed: Jul. 27, 1995

[51] Int. Cl.⁶ ........................................... G09G 5/00
[52] U.S. Cl. .............................. 345/173; 345/174
[58] Field of Search ................... 345/173, 174, 345/175, 176, 177, 178; 178/18, 19

[56] References Cited

U.S. PATENT DOCUMENTS 4,686,332  8/1987  Greanias et al. ................. 345/173
5,402,151  3/1995  Duwaer ............................. 345/174
5,502,461  3/1996  Okamoto et al. ................. 345/173

FOREIGN PATENT DOCUMENTS 4-68392  3/1992  Japan ................................ 345/173

*Primary Examiner*—Matthew Luu
*Attorney, Agent, or Firm*—Banner & Witcoff, Ltd.

[57] ABSTRACT

A host computer system employs a touch sensitive display screen (touchscreen) as an input device. A controller receives positional signals from the touchscreen and transmits positional digital values indicative of (X, Y) coordinates of the point of contact of a touch device upon the touchscreen. The touch device may take the form of a touch pen which is electrically coupled to the controller or a human finger. The controller responds to different commands from the host computer to transmit inputs entered only by finger, only by pen, or by both finger and pen. Additional commands from the computer cause the controller to take a variety of different actions, including resizing the active area on the touchscreen which may be touched by the touch device.

30 Claims, 4 Drawing Sheets

TOUCHSCREEN CONTROLLER WITH PEN AND/OR FINGER INPUTS

FIELD OF THE INVENTION

This invention relates generally to the field of touch sensitive computer input devices and more particularly to the field of controllers which control the operation of such devices.

BACKGROUND

Touch sensitive input surfaces such as touch sensitive computer display screens and digitizing tablets are finding increasing use in applications which make use of "user-friendly" computer interfaces. Computer systems which include a touch sensitive computer display screen, hereinafter "touchscreen", employ a controller which provides an interface between the computer and the touchscreen. A library of controller interface routines stored in the computer provides an application program with a set of commands which may be used by the application program to initialize the controller, select operating modes, specify data formats and execute diagnostic functions.

Capacitive type touchscreens which generate a uniform electrical potential across the surface of the screen are seeing increasing use due to the numerous advantages offered by such screens. Capacitive type touchscreens may be used with a variety of types of touch devices, such as touch pens and human fingers so long as the touch device is sufficiently conductive.

In instances where the touchscreen accepts touch devices such as a touch pen and a finger, it is often desirable to distinguish between inputs entered via the pen and inputs entered via contact of the finger. For instance, when a user is writing on the screen with a pen, portions of the user's hand or wrist may be touching the screen. In such a situation, it is particularly important to distinguish between the inputs entered by contact of the pen and inputs entered by inadvertent contact of the hand. Applications in which pen and finger inputs are accepted to perform different functions also benefit from a system which distinguishes between pen and finger inputs.

SUMMARY OF THE INVENTION

The present invention takes the form of a computer system which utilizes a touchscreen to accept input from a touch device which includes a touch pen or a human finger. The computer system includes a controller which provides an interface between the touchscreen and the computer. Applications making use of the input capabilities provided by the touchscreen employ an interface routine which provides a set of commands executable by the controller. The controller executes commands received from the computer and transmits positional data indicative of the position of a touch device on the screen in accordance with commands received from the computer.

In accordance with a principal feature of the invention, the controller determines if the touch device contacting the screen is a pen or a finger. The controller accepts a pen only command from the computer and responds by transmitting positional digital values to the computer only if the touch device contacting the screen is the touch pen. When only finger input is desired the computer transmits a finger only command and the controller responds by transmitting positional digital values to the computer only for inputs entered by a user's finger. When both pen and finger input are desired the computer transmits a pen and finger command and the controller responds by transmitting positional digital values to the computer for inputs entered by both pen and finger.

The pen only, finger only, and pen and finger commands provide increased versatility to an application programmer when developing application programs which make use of a touchscreen as an input device. Computer systems utilizing the principles of the invention provide properly programmed application programs with both the simplicity of finger input and the precision of pen input. The ability of a properly programmed application to accept different types of inputs enables programs to accept finger inputs for particular tasks, pen inputs for other types of tasks, which may possibly require more precision, and pen and finger inputs for yet different types of tasks.

These and other features and advantages of the invention will be better understood by considering the following detailed description.

DETAILED DESCRIPTION

Figure 1:
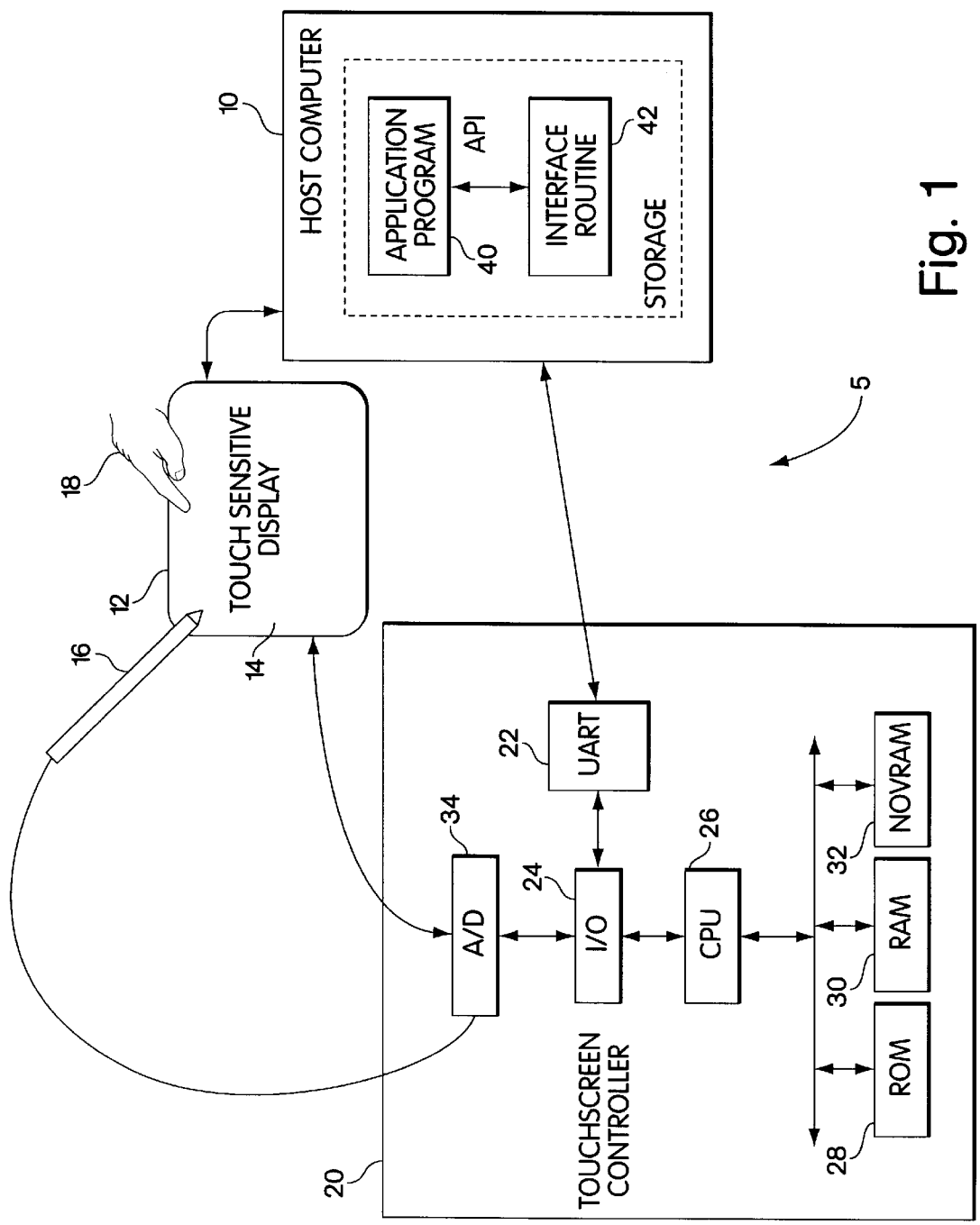
FIG. 1 is a schematic block diagram of a preferred embodiment.

FIG. 1 of the drawings shows a block diagram of a data processing system 5 which includes a host personal computer 10, a touch sensitive display 12, touch devices 16 and 18, and a touch screen controller 20. Display 12 includes a touchscreen 14 which provides a touch sensitive surface to accept input from touch devices such as touch pen 16 and a human finger 18. Touchscreen controller 20 receives positional signals from the display screen 14, digitizes the signals and transmits positional data to computer 10. Touchscreen 14 is preferably an analog capacitive sensing type screen which is available from MicroTouch Systems, Inc., Methuen, Mass. 01844. Such a touchscreen advantageously provides a durable scratch-resistant glass surface which is impervious to grease, dirt and water. Capacitive sensing techniques allow for fast response times, detection of very light touches and approximately one percent accuracy in the detection of the touched position throughout the surface of the screen. Aspects of the operation and construction of touchscreen 14 are described in U.S. Pat. No. 4,198,539 entitled System for Producing Electric Field With Predetermined Characteristics and Edge Terminations for Resistance Planes Therefor, which is hereby incorporated by reference.

Touchscreen controller 20 is connected to the RS-232C serial port of a conventional personal computer by means of a conventional UART (Universal Asynchronous Receiver/Transmitter) 22 which transmits and receives information to and from the personal computer 10 in bit serial format and in byte format with an input/output (I/O) port 24 of the touchscreen controller 20. Touchscreen controller is preferably a TouchPen type controller available from MicroTouch Systems, Inc., Methuen, Mass. 01844. Communication between the touchscreen controller and the computer is performed at 9600 baud with a protocol which includes no parity, eight data bits and one stop bit. In certain embodiments, the baud rate and parity bit may be changed by use of commands to be described. The touchscreen controller 20 includes a central processing unit (CPU) 26, a Read-Only Memory (ROM) 28 for storage of control programs, a Random Access Memory (RAM) 30 for temporary data storage, a Non-Volatile Random Access Memory (NOVRAM) 32 for long-term storage of changeable values, and Input/Output (I/O) ports 24 and an Analog/ Digital converter 34 for transmitting and receiving signals to and from the touchscreen 14 personal computer 10. The CPU 26 is preferably an Intel 80C198 microcontroller available from the Intel Corporation, Santa Clara, Calif. The touchscreen controller advantageously makes use of an Application Specific Integrated Circuit (ASIC) to implement the interface between the CPU 26 and the touchscreen 14.

Figure 3A:
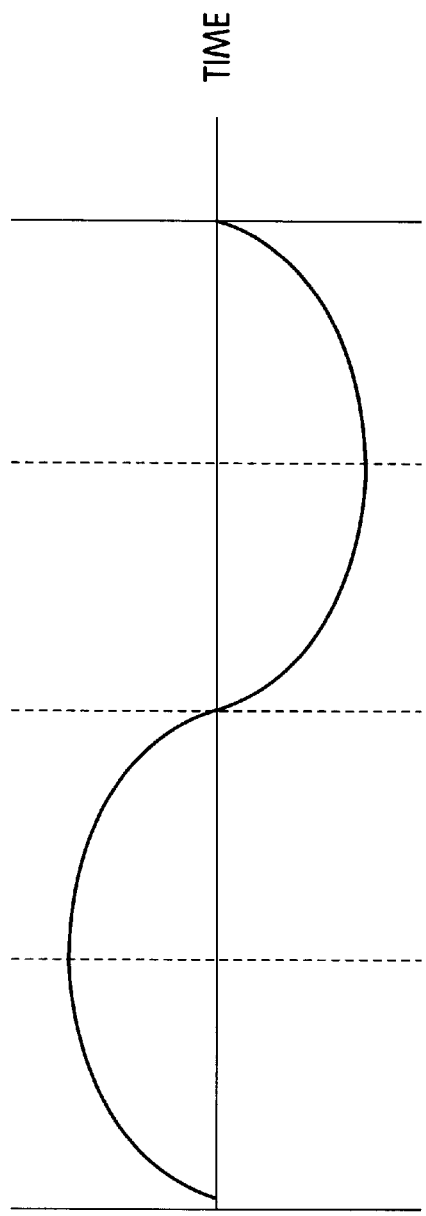
FIGS. 3(*a*) and 3(*b*) are graphical representations of the operation of selected aspects of a preferred embodiment.
Figure 3B:
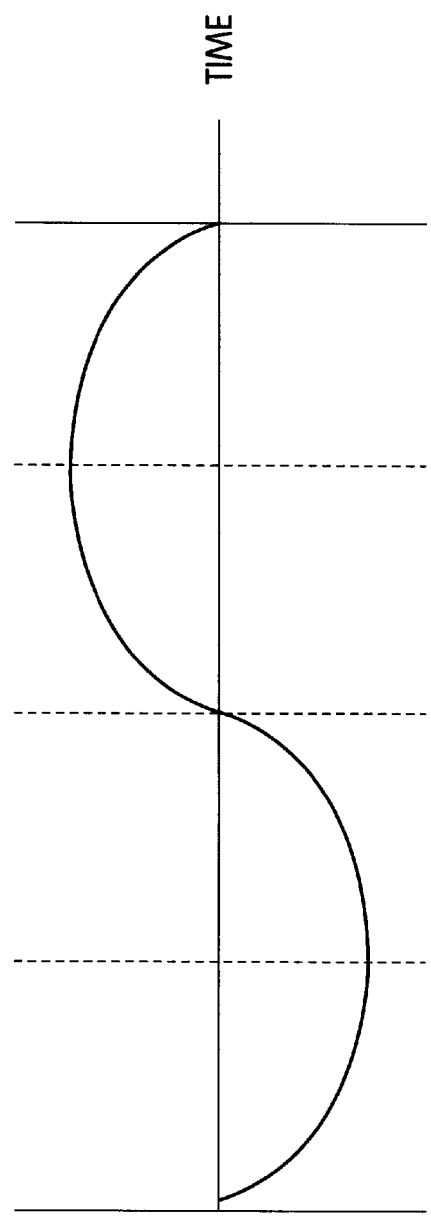

Touchscreen 14 is electrically coupled to controller 20 via four wires, which are each coupled to a corresponding corner of the touchscreen. Voltage is applied to the four corners of the touchscreen through the wires and electrodes printed on the touchscreen spread the voltage on the screen creating a uniform voltage field across the screen. Contact of a finger 18 with the surface of the touchscreen causes current to be drawn from each side of the screen in proportion to the distance from the edges of the screen. The change in current is reflected in a change in the voltage of each of the wires. The voltage change is detected by the controller 20 and converted into positional data utilizing conventional techniques. Within the controller 20, the A/D converter 34 converts the voltage in each of the wires into digital values which are then used by the controller to generate a pair of positional values indicative of the position on the touchscreen contacted by the finger. The signal applied to the corners of the screen is preferably a sinusoidal signal as seen in FIG. 3(*a*) of the drawings which shows a graphical representation of the signal.

Figure 2:
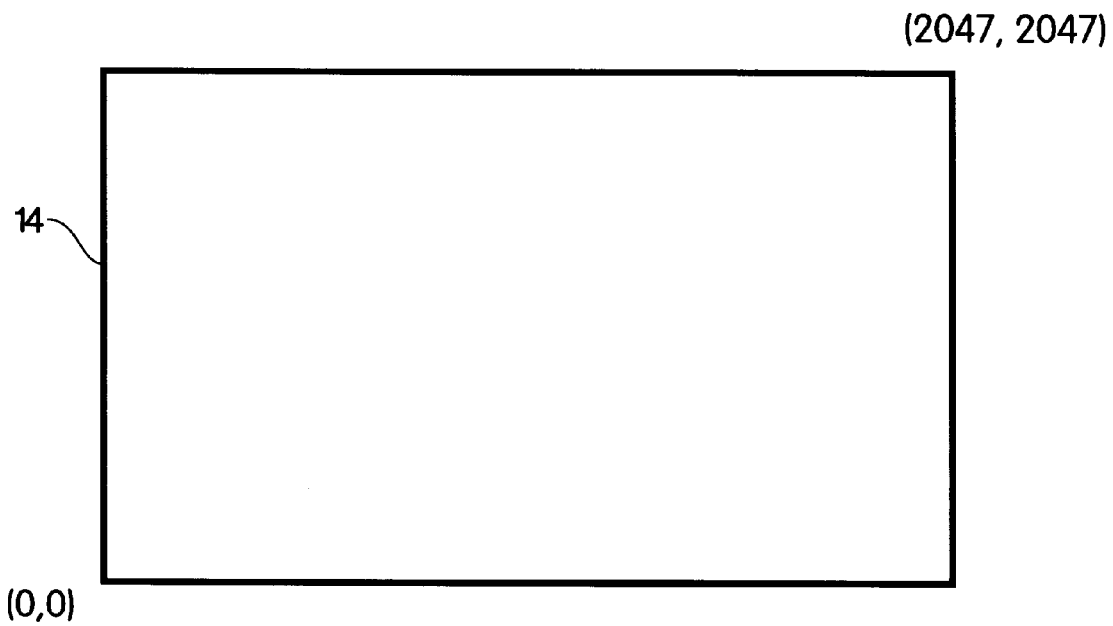
FIG. 2 is a simplified schematic representation of a preferred touchscreen.

Inputs entered into the touchscreen are assigned coordinates based on the scheme shown in FIG. 2, which shows a touchscreen 14 with a resolution of 2048×2048. As used herein, the terms "x-coordinate" and "y-coordinate" are intended to refer to positions on the touchscreen in the horizontal and vertical directions respectively. As seen in FIG. 2, the lower left hand corner of touchscreen 14 has (X, Y) coordinates of (0, 0) and the upper right hand corner of touchscreen 14 has coordinates of (2047, 2047).

Touchpen 16 is preferably a capacitive-digitizing type pen which is available from MicroTouch Systems, Inc., Methuen, Mass. Positional information from contact of touchpen 16 is generated by generating a sinusoidal waveform as seen in FIG. 3(*b*) through the tip of the touchpen. Contact of the touchpen 16 to the touchscreen 14 causes the sinusoidal signal to be detected at the four corners of the touchscreen in varying strength depending upon the proximity of the touchpen to each of the four corners. As seen in FIG. 3(*b*), the sinusoidal signal generated by the touchpen is 180 degrees out of phase with the sinusoidal signal generated at the corners of the touchscreen during finger input. The phase change is detected by the controller to discriminate between touchpen and finger inputs.

Host computer 10 which takes the form of a conventional personal computer, includes storage 12 which includes Random Access Memory (RAM) and higher density long term storage such as a magnetic hard disk. A standard library of interface routines in storage 12 advantageously provides a set of commands to be used by application programs which make use of the input capabilities of touchscreen 14. Such application programs, as seen at 40, respond to and control the touchscreen 14 by making standard procedure calls to the interface routine 42, which causes the desired exchange of commands and data between the computer and the touchscreen controller. The interface routine may be statically linked with the application programs at compilation time, or be dynamically linked with the library and application code at runtime. In accordance with the invention, a wide variety of application programs can thus be written to make effective use of the touchscreen using a standard set of easily understood Application Program Interface (API) function calls which may be conveniently expressed in the same language used by the application programmer for conventional programming.

Data Format

Positional data, containing the (X,Y) coordinates of the touch device, transmitted from the touchscreen controller to the computer preferably takes the form of a five-byte packet which includes status information in the first byte, x-coordinate information in the second and third bytes and y-coordinate information in the fourth and fifth bytes. The status information in the first byte provides information as to whether the (x, y) coordinates in the succeeding bytes indicate a position upon initial contact of the touch device with the screen (touchdown), continued contact with the screen (touch continuation), or termination of contact with the screen (lift off).

As used herein, the term "pen lift-off packet" refers to positional data transmitted from the controller to the computer in which the first byte informs the computer that the pen has lifted off of the surface of the screen and the succeeding bytes contain the positional information of the lift-off. The term "pen touchdown packet" refers to positional data transmitted from the controller to the computer in which the first byte informs the computer that touchdown of the pen has occurred and the succeeding bytes contain the positional information of the touchdown. The terms "finger lift-off packet" and "finger touchdown packet" are intended to have correspondingly similar meanings. Moreover, the terms "finger" and "hand" are both intended to refer to inputs entered by contacting of the touchscreen with a body part such as a finger or hand. Certain applications may benefit from contact of the foot or other parts of the body and the terms "finger" and "hand" are intended to refer to such types of contacts.

Command Format

A command transmitted from the computer to the controller preferably takes the following format:

<Header>Command<Terminator>

The header is the first character is the command string and takes the form of an ASCII start-of-header character <SOH>, which is equivalent to the value 01 in hexadecimal format. The terminator is the last character of each command string and takes the form of an ASCII carriage return, which is equivalent to the value OD in hexadecimal format. Commands transmittable by the computer and implemented in the controller are explained separately below.

Controller Response Format

After executing a command, the controller transmits a response in the form of an acknowledgment to the computer. Each controller response consists of a header, the command response, and a terminator in the following format:

<Header>Command Response<Terminator>

The header and terminator take the same form as the header and terminator which accompany a computer command as described above. The Command Response takes a number of forms, depending upon the command and is described below along with the description of the commands.

Pen and/or Finger Inputs

A preferred embodiment of controller 20 advantageously responds to appropriate commands transmitted by computer 10 to transmit only inputs entered by touchpen 16, finger 18 or both the touchpen and the finger. A finger only command transmitted by computer 10 results in only inputs which are entered by finger being transmitted to the computer. Inputs entered by the touchpen when the controller is in finger only mode are ignored by the controller. A pen only command transmitted by computer 10 results in only inputs which are entered by touchpen to be transmitted to the computer. Inputs entered by finger when the controller is in pen only mode are ignored by the controller.

Figure 4:
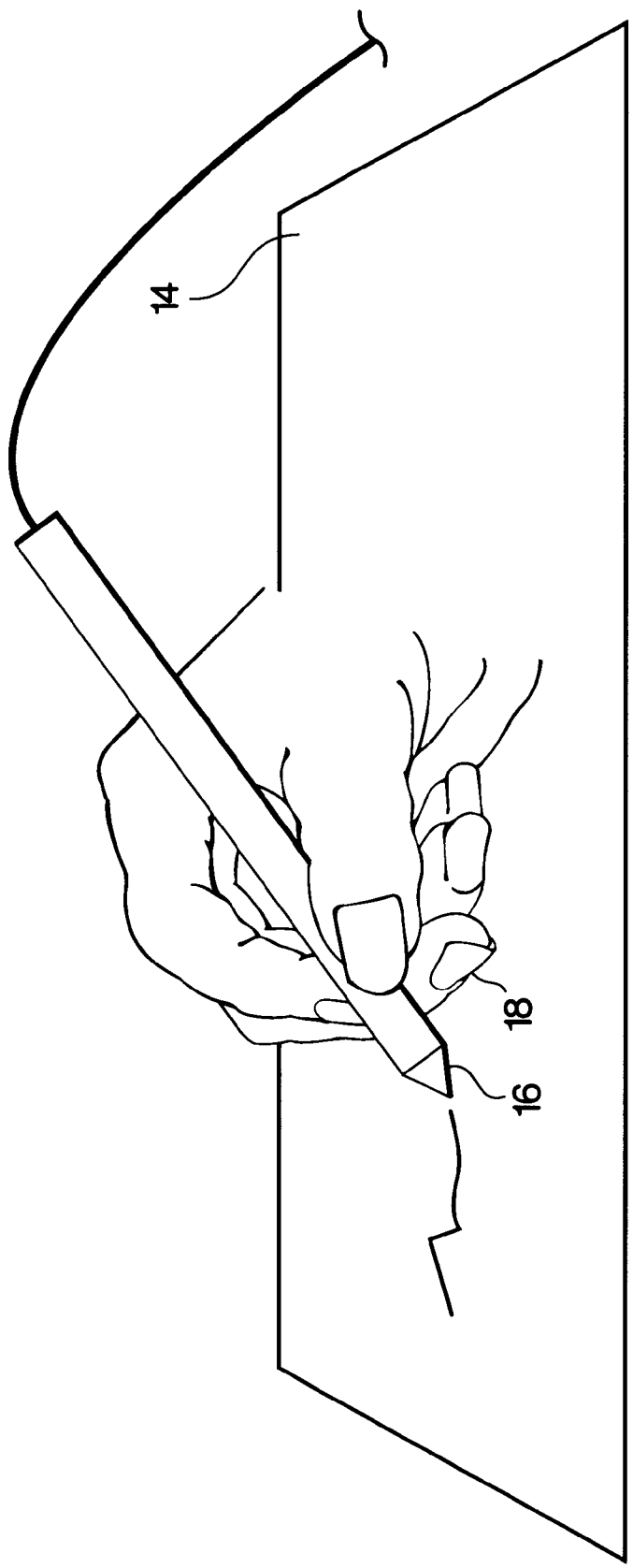
FIG. 4 is a diagram showing the entry of pen input into the touchscreen.

When the controller is in pen or finger mode, the controller continues to distinguish between pen and finger inputs, but screens out finger or hand contacts at certain times to allow for enhanced pen input. When the pen is being used and lifts off the screen, the controller may advantageously ignore inputs entered by finger or hand for a period of time to allow pen inputs to be entered naturally with interruptions in writing which occur when using a pen. For instance, as seen in FIG. 4, when the user's hand is resting on the touchscreen while writing, pen lift-offs are transmitted but the input caused by the hand is ignored for a calibratable period of time. Preferably an application program may utilize one of sixteen delay values starting from zero delay and increasing in multiples of one second. Upon expiration of the calibrated delay period, the presence of hand or finger inputs are transmitted by the controller to the computer. The calibratable delay is overridden by lift-off and retouching of the hand or finger. Thus, a long delay may be set and overridden by the user if desired. Entry of pen input during pen or finger mode is further enhanced by transmitting pen inputs when the user's hand is placed upon the screen before the pen. For instance, if the user is preparing to use the pen to write on the screen, the hand may be placed upon the screen before contact of the pen with the screen. In such an instance, the contact of the hand with the screen is detected and a finger touchdown packet is transmitted. Contact of the pen causes a finger lift-off packet to be transmitted, followed by a pen touchdown packet.

CONTROLLER COMMANDS

In addition to the pen only, finger only and pen and finger commands, the controller implements additional commands to provide an application programmer with a rich set of functions with which to develop programs which utilize the broad range of functionality allowed by the touchscreen. The controller executes the following commands in response to a request from the computer:

Calibrate Extended

Calibrate Raw

Finger Only

Format Raw

Format Tablet

Get Parameter Block

Mode Stream

Null Command

Output Identity

Pen Only

Pen or Finger

Reset

Restore Defaults

Set Parameter Block

Unit Type

The commands listed above and described separately in detail below provide a standard interface to an application program making use of the input capabilities of the touch screen 14. Provided with the below explanation of each of the commands is the format of the command, a description of the functions performed by the command and a description and format of the controller response. The following descriptions will enable those skilled in the art to implement the commands executed by the controller and to use the command set in an application program which accepts input entered via the touchscreen 14.

Calibrate Extended

Syntax: <SOH>CX<CR>

Description: Initiates an interactive, two-point calibration of the touchscreen, to allow for calibration of the size of the active area of the touchscreen. As used herein, the term "active area" refers to a rectangular area on the touchscreen which may be contacted by a touch device to cause transmission of positional digital values indicative of the position of the contact of the touch device. Contact of a touch device outside of the active area is ignored by the controller.

The calibration points (targets) are set inward from the corner of the video image provided by the touchscreen for accuracy and ease of operation. During calibration, the active area of the touch screen is defined by mapping locations to an absolute X, Y coordinate system. Two target areas on the screen are touched which sends the X, Y coordinates for those touch points to the controller. The controller calculates all other touch points based on these two values.

Determining Target Areas

Figure 5:
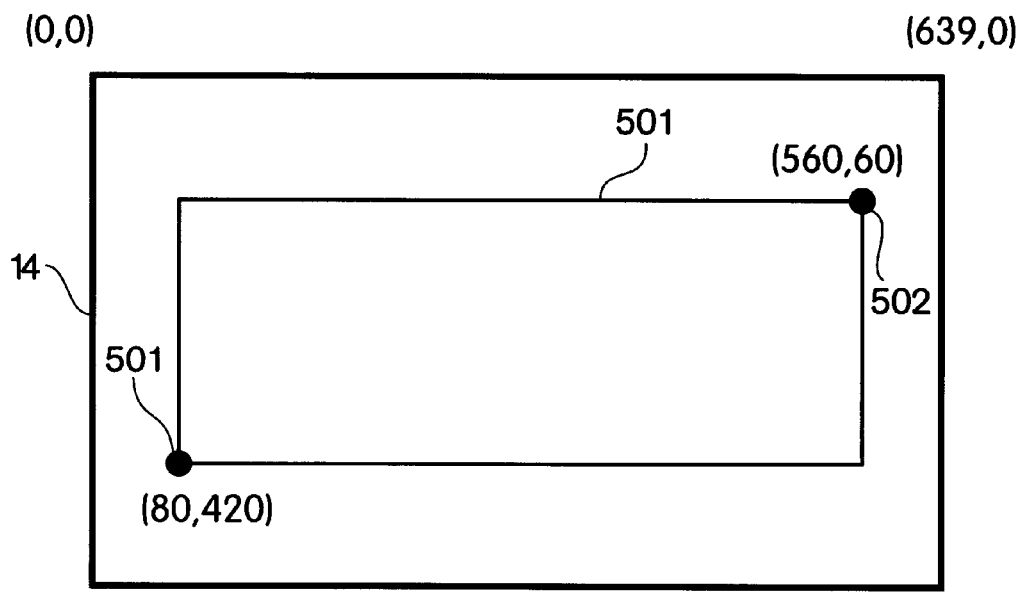
FIG. 5 is a simplified schematic representation of a touchscreen and a preferred calibration mechanism.

The default calibration targets (points) are located 12.5% (⅛) inward from the corner of the video image. FIG. 5 of the drawings illustrates how the calibration targets are calculated. In FIG. 5 resolution of the display 12 is 640×480. The coordinates of the touchscreen start from coordinates (0, 0) at the upper left corner of the touchscreen to coordinates (639, 479) at the lower left corner of the touchscreen. Two calibration targets are set. The first is seen at point 502 and the second is seen at point 504. The active area is seen defined by rectangle 501 to corners of which are defined by points 502 and 504. The Calibrate Extended command calculates the amount to move inward as follows:

Amount to move inward in the X direction: 640×⅛=80

Amount to move inward in the Y direction: 480×⅛=60

The Calibrate Extended command then positions the calibration target inward from the lower left corner (0,479) and the upper right corner (639,0).

Stable calibration points are advantageously obtainable because the controller uses the data immediately before lift off. Therefore, calibration may be accomplished by Touching off of the target, moving a finger to the target, holding the finger at the target for one second, and then lifting off. Calibration for pen and finger input should be performed separately as data for each type of calibration is stored separately. The calibration data is advantageously stored in the NOVRAM, eliminating the need for calibration every time the system is powered on. A calibration may be cancelled using a Reset command which is described below.

The following three steps need to be performed to calibrate the touchscreen utilizing the Calibrate command:

1. Enter the Calibrate Extended (CX) command. The controller sends an acknowledgment of <SOH>0<CR>.

2. Touch the screen at a lower, left target, which is located 12.5% (⅛) in from the corner of the video image. The controller returns an acknowledgment of <SOH>1>CR>. This is a positive response. If a negative response is received the screen should be touched again. 3. Touch the screen at an upper, right target, which is located 12.5% (⅛) in from the corner of the video image. The controller returns an acknowledgment of <SOH>1>CR>. If a negative response is received the screen should be touched again.

Touching the two valid calibration points results in a successful calibration. If either calibration point is invalid, the calibration fails. If the calibration fails, the controller responds by returning to the previous calibration values.

| Response: | <SOH>1<CR> | Positive response. Indicates that the controller received a valid touch coordinate (point) when the target was touched. |
|---|---|---|
| | <SOH>0<CR> | Negative response. Indicates that the touch point is out of ranges of the expected target area. If this response is received the touchscreen should be touched again. |
| | <SOH>2<CR> | Indicates that the screen was touched too quickly to provide an accurate calibration point. If this response is received the touchscreen should be touched again. |

Calibrate Raw

Syntax: <SOH>CR<CR>

Description: Allows the collection of raw relative (signed) X and Y coordinates prior to the normal scaling, linearization, and filtering processes. The controller sends the coordinates whenever a touch is detected and continues to send a stream of data as long as a finger or pen remains in contact with the touch screen. The calibration data is a 5-byte packet that includes 1 status byte and 4 bytes of binary X, Y coordinate data. Each X, Y coordinate includes 10 binary bits and 1 sign bit. The 10 bits represent coordinates within a range of −1024 to +1023. To use the Calibrate Raw command, the controller and computer must be in an 8-bit data communication mode. Additionally, if a touch pen is being used, the controller must be in Pen Only or Finger Only modes as described below, before executing the Calibrate Raw command. The Calibrate Raw command is completed by issuing a Reset command. Response: <SOH>0<CR> Positive response.

After the controller is in Calibrate Raw mode, touching the screen causes the controller to return a response in the following format:

S$xx$Y$y$ where:

S=Status byte; first byte of data. Refer to table 1 which describes the meaning of the bits in the status byte (Byte 1).

X$x$=X (horizontal) coordinate data; second and third bytes of data.

Y$y$=Y (vertical) coordinate data; fourth and fifth bytes of data.

| | MSB | | Bits | | | LSB | | |
|---|---|---|---|---|---|---|---|---|
| Data Sequence | 7 | 6 | 5 | 4 | 3 | 2 | 1 | 0 |
| S-Byte 1 | 1 | S6 | S5 | S4 | S3 | S2 | S1 | S0 |
| X-Byte 2 | 0 | X3 | X2 | X1 | X0 | 0 | 0 | 0 |
| x-Byte 3 | 0 | Xs** | X9 | X8 | X7 | X6 | X5 | X4 |

-continued

| | MSB | | Bits | | | LSB | | |
|---|---|---|---|---|---|---|---|---|
| Data Sequence | 7 | 6 | 5 | 4 | 3 | 2 | 1 | 0 |
| Y-Byte 4 | 0 | Y3 | Y2 | Y1 | Y0 | 0 | 0 | 0 |
| y-Byte 5 | 0 | Ys** | Y9 | Y8 | Y7 | Y6 | Y5 | Y4 |

*MSB = Most Significant Bit, LSB = Least Significant Bit
**s - signed bit

TABLE 1

Calibrate Raw Status Bits

| Bit | Description | Values |
|---|---|---|
| S0 | Switch 1 status | For the TouchPen only.<br>1 = Switch is on (pressed).<br>0 = Switch is off. |
| S1 | Switch 2 status | For the TouchPen only.<br>1 = Switch is on (pressed).<br>0 = Switch is off. |
| S2–S5 | Reserved | — |
| S6 | Proximity (Touch state) | 1 = Finger or pen touching the screen.<br>0 = Touch screen is not being touched.<br>When the proximity bit changes from 1 to 0 (touch lift off), one final set of X, Y coordinate data is output with the proximity bit equal to 0 and the X, Y coordinate data equal to the last touch point. |
| S7 | Packet Synchronization | Always 1. |

Finger Only

Syntax: <SOH>FO<CR>

Description: Causes the controller to accept only finger input. The controller ignores pen input. The controller offers three touch device inputs:

(1) Pen or Finger mode detects pen and finger contact, giving priority to pen contact when both are detected.

(2) Finger Only mode detects finger contact only and processes finger coordinate data.

(3) Pen Only mode detects pen contact only and processes pen coordinate data.

This setting changes back to the default setting at power-up, or if a Restore Defaults command is issued. If the default setting in the controller data block 1 has been changed, this setting only changes back to the default setting with a Restore Defaults command.

Response: <SOH>0<CR> Positive response.

Format Raw

Syntax: <SOH>FR<CR>

Description: This command is used primarily for diagnostics. It causes the controller to return the signal level (amount of touch) of each of the four touchscreen corners in digital format. The returned values are not corrected for offset and stray values. However, the offset and stray values may be obtained using the Get Parameter Block command. The Format Raw data is a 7-byte packet that includes 1 status byte and 6 bytes of binary corner data. The data format for the packet is advantageously fixed in order to provide the most efficient transfer of data. The first byte of each packet always has its high bit (Bit 7) set to provide synchronization with the host system. Data is returned in 10-bits, which are delivered in two bytes.

To use Format Raw, the controller and host must be in an 8-bit data communication mode. A Reset command must be issued to terminate format Raw The controller may return several bytes of data between the time a Reset command is issued and when the controller receives the Reset command. A continuous scan can be performed for the Reset acknowledgment or a second Reset after approximately 10 seconds has passed may be issued.
Response: <SOH>0<CR> Positive response.

After the controller is in Format Raw mode, the controller continuously outputs data in the following format:

<7-byte-packet><7-byte-packet> . . . <7-byte-packet> . . .

| Byte | Bits 0–7 | |
|---|---|---|
| 1 | b0–b3: | Drive level (amount of signal sent from controller) |
| | b4: | Reserved |
| | b5: | Reserved |
| | b6: | Reserved |
| | b7: | Synchronization bit (Always 1) |
| 2 | b0–b2: | 3 most significant bits of upper left (UL) corner |
| | b3: | Always 0 |
| | b4–b6: | 3 most significant bits of lower left (LL) corner |
| | b7: | Always 0 |
| 3 | b0–b2: | 3 most significant bits of lower right (LR) corner |
| | b3: | Always 0 |
| | b4–b6: | 3 most significant bits of upper right (UR) corner |
| | b7: | Always 0 |
| 4 | b0–b6: | 7 least significant bits of lower left (LL) corner |
| | b7: | Always 0 |
| 5 | b0–b6: | 7 least significant bits of upper left (UL) corner |
| | b7: | Always 0 |
| 6 | b0–b6: | 7 least significant bits of upper right (UR) corner |
| | b7: | Always 0 |
| 7 | b0–b6: | 7 least significant bits of lower right (LR) corner |
| | b7: | Always 0 |

Format Tablet
Syntax: <SOH>FT<CR>
Description: Causes the controller to output the X, Y touch coordinate data in a 5-byte packet. The packet includes 1 status byte and 4 bytes of binary X, Y coordinate data. The protocol also establishes the X and Y coordinate output as 14 binary bits providing a range of 0 to 16,383. The low order bits (X3–X0 and Y3–Y0) in a 1024 by 1024 touch screen are not significant because data can fluctuate with each touch, and therefore may not be completely accurate. To use Format Tablet, the controller and host system must be in an 8-bit data communication mode.
Response: <SOH>)<CR> Positive response.

After the controller is in Format Tablet mode, touching the screen causes the controller to return a response in the following format:

SxxYy

S=Status byte; first byte of data. Refer to Table 2 below which defines the status bits (Byte 1) for the Format Tablet data.

Xx=X (horizontal) coordinate data; second and third bytes of data.

Yy=Y(vertical) coordinate data; fourth and fifth bytes of data.

| | MSB* | | Bits | | | LSB | |
|---|---|---|---|---|---|---|---|
| Data Sequence | 7 | 6 | 5 | 4 | 3 | 2 | 1 | 0 |
| S-Byte 1 | 1 | S6 | S5 | S4 | S3 | S2 | S1 | S0 |
| X-Byte 2 | 0 | X6 | X5 | X4 | X3 | X2 | X1 | X0 |
| x-Byte 3 | 0 | X13 | X12 | X11 | X10 | X9 | X8 | X7 |
| Y-Byte 4 | 0 | Y6 | Y5 | Y4 | Y3 | Y2 | Y1 | Y0 |
| y-Byte 5 | 0 | Y13 | Y12 | Y11 | Y10 | Y9 | Y8 | Y7 |

*MSB = Most Significant Bit, LSB = Least Significant Bit

TABLE 2

Format Tablet Status Bits

| Bit | Description | Values |
|---|---|---|
| S0 | Switch 1 status | For the TouchPen only. 1 = Switch is on (pressed). |
| S1 | Switch 2 status | 0 = Switch is off. |
| S2–S4 | Reserved | — |
| S5 | Pen or Finger | For the TouchPen only 1 = Screen touched with a pen. 0 = Screen touched with a finger. |
| S6 | Proximity | 1 = Touch screen is being touched (a touch down or a continued touch). 0 = Touch screen is not being touched (a touch lift off or inactive). When the proximity bit changes from 1 to 0 (touch lift off), one final set of X, Y coordinate data is output with the proximity bit equal to 0 and the X, Y coordinate data equal to the last touch point. |
| S7 | Packet Synchronization | Always 1. |

Get Parameter Block
Description: Allows access to all power-up and run time parameters used by the controller. The Get Parameter Block (GP) command works in conjunction with the Set Parameter Block (SP) command. This pair of commands is used for configuration and diagnostic purposes. Parameters are retrieved using command GP and modified in data blocks using command SP. The blocks include calibration and initialization data, linearization data, and run time variables.
Mode Stream
Syntax: <SOH>MS<CR>
Description: Causes the controller to send a continuous stream of (X, Y) coordinate data when the screen is touched. The controller continues to send data as long as the screen is touched. The controller sends the data even if the touch is stationary and unchanging. The format of the coordinate data depends on the last format command received by the controller. The controller must be in the appropriate mode (Pen Only, Finger Only, or Pen or Finger) for the pen or finger to be detected.
Response: <SOH>O<CR> Positive response.
Null Command
Syntax: <SOH>Z<CR>
Description: Queries the controller and waits for a response. This command is used to determine if communication with the controller is established. Using this command does not affect the controller's current operating parameters.
Response: <SOH>0<CR> Positive response.
Output Identity
Syntax: <SOH>OI<CR>
Description: Causes the controller to report a firmware identity string, which includes the controller type and the firmware version number.

Response: <SOH>CcXxxx<CR>
where:
Cc=two ASCII characters that describe the type of controller.
P5=TouchPen controller
Q1=Serial/SMT3 controller
Xxxx=Four ASCII characters that indicate the firmware version number in decimal format. The first two characters represent the version number; the last two characters represent the revision level. For example, 0100 means Version 1, Revision 0 (that is 1.0) or 0510 means Version 5, Revision 1 (5.1).
Pen Only
Syntax: <SOH>PO<CR>
Description: Causes the controller to accept only pen input. The controller ignores finger data. This setting changes back to the default setting at power-up, or if a Restore Defaults command is issued. If the default setting in the controller data block 1 has been changed, this setting only changes back to the default setting with a Restore Defaults command.
Response: <SOH>0<CR> Positive response.
Pen or Finger
Syntax: <SOH>PF<CR>
Description: Causes the controller to search for both pen and finger contact. When the controller detects both pen and finger contact at the same time, pen contact has higher priority and the controller sends pen coordinate data to the host computer. If the controller detects only finger contact, it sends the finger coordinate data to the host computer. In this mode, if the pen is being used and it is lifted off the screen the controller does not detect finger or hand touch for a specified amount of time, and until the finger(or hand) is lifted off the screen and touches the screen again. For example, if a user's hand is resting on the screen while using the pen, the pen may be lifted off the screen, then placed back down and writing continued without any hand contact being interpreted as input. The amount of time the system waits before acknowledging finger contact may advantageously be changed using the Set Parameter Block command.

If a finger is being used as a touch device and the pen touches the screen, the pen overrides the finger input and the controller sends a signal to the system to acknowledge only pen input. This prevents accidental connections being made between finger (or hand) contact and pen contact. The pen mode changes back to the default setting at power-up, or if a Restore Defaults command is issued. If Set Parameter Block command was used to modify the default setting in the controller data block 1, Pen mode only changes back to the default setting when a Restore Defaults command is issued. Response: <SOH>0>CR> Positive response.
Reset
Syntax: <SOH>R<CR>
Description: Initializes the hardware and the firmware, causes the controller to stop sending data, and recalculates the environmental conditions (for example, stray and offset values). The Reset command also cancels the Format Raw and Calibrate Raw commands and returns the touch controller to normal operation. The computer should preferably issue a Reset command whenever it is powered on and is attempting to establish communication with the touch controller. The Reset command may take up to 240 milliseconds (0.25 seconds) to execute. Therefore, the application program should wait at least 250 milliseconds (and receive the command response) before issuing another command to the touch controller following the reset.

Response: <SOH>0>CR) Positive response.
Restore Defaults
Syntax: <SOH>RD<CR>
Description: Causes the touch controller to assume factory default operating parameters. The Restore Defaults command copies the factory default parameters from ROM to the non-volatile memory (NOVRAM) and then executes a Reset command. Table 3 lists the factory defaults. The Restore Defaults command is useful in situations where inadvertent commands to the controller have rendered the touch screen inoperative.

TABLE 3

Factory Defaults

| Parameter | |
|---|---|
| Data Format | Format Tablet |
| Operating Mode | Mode Stream |
| Serial Settings | N, 8, 1 |
| Baud Rate | 9600 |
| AutoBaud | N/A |
| Pen Mode | Pen or Finger Mode |
| Return to Factory Calibration | Yes |

The Restore Defaults command requires approximately 75 to 100 milliseconds, plus the execution time of the Reset command. Accordingly, the host application program should wait a minimum of 350 milliseconds (and receive the command response) before issuing another command to the touch controller.
Response: <SOH>0<CR> Positive response.
Set Parameter Block
Description: Allows access to all power-up and run time parameters used by the controller. The Set Parameter Block (SP) command works in conjunction with the Get Parameter Block (SP) command. This pair of commands is used for configuration and diagnostic purposes. Parameters are retrieved (using GP), and modified (using SP) in data blocks. The blocks include calibration and initialization data, linearization data, and run time variables.
Unit Type
Syntax: <SOH>UT<CR>
Description: Causes the controller to report a controller identity string. This string identifies the type of controller currently attached to the system, lists the features supported by the controller, and outputs the status of the touch controller hardware.
Response: Returns an indentification code up to 8 ASCII characters in the following format:

<SOH>TTF*fff*S*s*<CR> where:
TT=Two ASCII characters that indicate the controller type.
TP=TouchPen controller
QM=Serial/SMT3 controller
Ffff=Four ASCII characters that indicate the features supported by the controller
Asterisks ( * * * ) indicate that no additional features are configured.
Ss=Two ASCII characters that provide status information about the touch controller hardware. The two characters represent one byte. Each character is in the range 0 to 9 and A to F.
Table 4 defines the meaning of each bit in the status byte. Each bit can be set to 1 or 0, where:

1=Error
0=No error
00=No diagnostic errors (normal response)

TABLE 4

Bit Definition for the Unit Type Command.

| Bit | Serial/SMT#Status | TouchPen Status |
|---|---|---|
| 0 | Reserved | RAM error. Hardware malfunction. |
| 1 | ROM error. Firmware checksum verification error. | Same. |
| 2 | PWM error. Unable to establish PWM operating range at power up. Nonrecoverable error. | Analog-to-digital (A/D) error. The A/D converter malfunctioned. |
| 3 | NOVRAM error. The operating parameters in the controller NOVRAM are invalid. Using defaults. | Same. |
| 4 | HDW error. The controller hardware failed (unable to initializ or configure gate array). Nonrecoverable error. | ASIC error. The Application Specific Integrated Circuit (ASIC) failed. |
| 5 | Reserved. | Reset flag. 1 = A Unit Type command has not been Issued since the last reset. 0 = A Unit Type command has been issued Since the last reset. |
| 6 | Cable error. The linearization Data in the cable NOVRAM is invalid. | Reserved. |
| 7 | NOVRAM2 error. The linearization data in the controller NOVRAM is invalid. | Same |

It is to be understood that the specific mechanisms and techniques which have been described are merely illustrative of one application of the principles of the invention. Numerous modifications may be made to the methods and apparatus described without departing from the true spirit and scope of the invention.

What is claimed is:

1. A touchscreen controller for controlling operation of a touch sensitive screen in response to commands from an application program executing on a data processor that is electrically coupled to the controller, the controller comprising, in combination:
    means, responsive to a plurality of analog signals indicative of a position on said screen of a touch device touching said screen, for generating positional digital values indicative of two-dimensional coordinates of the position of said touch device on said screen;
    means, responsive to a touch pen, electrically coupled to said controller, for determining if the touch device contacting the screen is a pen or a finger;
    means, responsive to a pen only signal produced by said data processor in response to a pen only command of said commands, for transmitting said positional digital values to said data processor only if said touch device contacting said screen is said touch pen;
    means, responsive to a finger only signal produced by said data processor in response to a finger only command of said commands, for transmitting said positional digital values to said data processor only if said touch device contacting said screen is said finger; and
    means, responsive to a pen and finger signal produced by said data processor in response to a pen and finger command of said commands, for transmitting said positional digital values to said data processor if said touch device contacting said screen is said pen or said finger.

2. A touchscreen controller as set forth in claim 1 wherein the means for transmitting said positional digital values to said data processor if said touch device contacting said screen is said pen or said finger comprises means, responsive to concurrent contact of said finger and said pen, for transmitting positional digital values indicative of the position of said pen.

3. A touchscreen controller as set forth in claim 2 wherein the means for transmitting said positional digital values to said data processor if said touch device contacting said screen is said pen or said finger further comprises means, responsive to termination of contact of said pen with said touchscreen, for ignoring contact of said finger for a calibratable period of time.

4. A touchscreen controller as set forth in claim 3 wherein the means for ignoring contact of said finger for a calibratable period of time, comprises override means, responsive to lift-off and subsequent contact of said finger, for transmitting positional digital values indicative of the position of said finger.

5. A touchscreen controller as set forth in claim 4 wherein the means for transmitting said positional digital values to said data processor if said touch device contacting said screen is said pen or said finger further comprises means, responsive to contact of said finger with said touchscreen and subsequent contact of said pen with said touchscreen during said contact of said finger, for transmitting positional digital values indicative of the position of said pen.

6. A touchscreen controller as set forth in claim 5 further comprising means for defining a rectangular active area on said touchscreen, wherein said controller transmits positional digital values indicative of the position of a touch device only upon contact of said touch device within said active area, said means for defining an active area responding to contact of said touch device at a first point and at a second point by defining boundaries of said rectangular active area such that said first point and said second point are at diagonally opposite corners thereof.

7. A touchscreen controller as set forth in claim 6 wherein said controller transmits along with said positional values, touch device contact values which indicate if said positional values correspond to continued contact of said touch device with said touchscreen, initial contact of said touch device with said touchscreen, or termination of contact of said touch device with said touchscreen.

8. A touchscreen controller as set forth in claim 7 further comprising means for applying an electrical signal to a contact surface of said touchscreen, and wherein the means for determining if the touch device contacting the screen is a pen or a finger comprises means is responsive to a phase shift in said electrical signal.

9. A touchscreen controller as set forth in claim 4 further comprising means, responsive to a stream command, for continuously transmitting said positional digital values for the duration of contact of said touch device with said touchscreen, irrespective of movement of said touch device.

10. A touchscreen controller as set forth in claim 1 wherein the means for transmitting said positional digital values to said data processor if said touch device contacting said screen is said pen or said finger further comprises means, responsive to contact of said finger with said touchscreen and subsequent contact of said pen with said touchscreen during said contact of said finger, for transmitting positional digital values indicative of the position of said pen.

11. A touchscreen controller as set forth in claim 1 further comprising means for defining a rectangular active area on said touchscreen, wherein said controller transmits positional digital values indicative of the position of a touch device only upon contact of said touch device within said active area, said means for defining an active area responding to contact of said touch device at a first point and at a second point by defining boundaries of said rectangular active area such that said first point and said second point are at diagonally opposite corners thereof.

12. A touchscreen controller as set forth in claim 1 wherein said controller transmits along with said positional values, touch device contact values which indicate if said positional values correspond to continued contact of said touch device with said touchscreen, initial contact of said touch device with said touchscreen, or termination of contact of said touch device with said touchscreen.

13. A touchscreen controller as set forth in claim 1 further comprising means for applying an electrical signal to a contact surface of said touchscreen, and wherein the means for determining if the touch device contacting the screen is a pen or a finger comprises means is responsive to a phase shift in said electrical signal.

14. A touchscreen controller as set forth in claim 1 further comprising means, responsive to a stream command, for continuously transmitting said positional digital values for the duration of contact of said touch device with said touchscreen, irrespective of movement of said touch device.

15. In a computer system which executes computer programs including an application program, the computer system including a storage unit, a central processing unit, input means for providing input data to the storage unit and central processing unit said input means including a touch sensitive display screen, and output means for providing discernible indications of actions performed by the central processing unit, said output means including said touch sensitive display screen, said storage unit containing one or more further programs which when executed in the computer system comprise:
  means, responsive to a first command from the application program, for transmitting a pen only command to a controller which controls said display screen to cause said controller to transmit only data indicative of inputs entered via said touchscreen by a pen electrically coupled to said touchscreen;
  means, responsive to a second command from the application program, for transmitting a finger only command to said controller to cause said controller to transmit only data indicative of inputs entered via said touchscreen by a user finger; and
  means, responsive to a third command from the application program, for transmitting a pen and finger command to said controller to cause said controller to transmit data indicative of inputs entered via said touchscreen by said pen or said finger.

16. A computer system as set forth in claim 15 wherein said one or more programs, when executed in the computer system, further comprise:
  means, responsive to a fourth command, for transmitting an active area command defining a rectangular active area on said touchscreen by touching said touchscreen at two points, each of which defines a diagonally opposite corner of said rectangular active area.

17. A computer system as set forth in claim 15 wherein said means responsive to said third command causes said controller to transmit data indicative of inputs entered via said touchscreen by said pen upon concurrent contact of said touchscreen by said pen and said finger.

18. A computer system as set forth in claim 17 wherein said means responsive to said third command causes said controller to ignore contact of said finger for a calibratable period of time upon termination of contact of said pen with said touchscreen.

19. A computer system as set forth in claim 18 wherein said means responsive to said third command causes said controller to override said calibratable period of time upon contact, lift-off and subsequent contact of said finger with said touchscreen.

20. A computer-readable storage apparatus for use in a data processor which is coupled to a touch sensitive input screen which accepts input from a pen electrically coupled to said screen and from touching of a human finger to said screen, said data processor being coupled to said screen by a controller which accepts positional signals from the screen and which receives commands from the data processor and transmits digital data indicative of the position of an input to the screen, the storage apparatus containing one or more programs which, when executed in said data processor, comprise in combination:
  means, responsive to a first command from an application program being executed by said data processor, for causing said data processor to transmit a pen only command to said controller to cause said controller to transmit only data which is indicative of inputs entered via said pen;
  means, responsive to a second command from the application program, for transmitting a finger only command to said controller to cause said controller to transmit only data indicative of inputs entered via said touchscreen by said human finger; and
  means, responsive to a third command from the application program, for transmitting a pen and finger command to said controller to cause said controller to transmit data indicative of inputs entered via said touchscreen by said pen or said by said finger.

21. An improved controller for controlling a touch-sensitive panel which receives touch inputs from more than one type of touch device and has a first output which indicates a position in the touch panel and a second output which indicates the type of the touch device that is currently providing the touch inputs, the controller responding to the first and second outputs and to commands from an application program executing on a host processor and the controller having the improvement comprising:
  a processor which responds to a command from the application program that specifies a type of touch device and to the second output from the touch sensitive panel by providing digital coordinates corresponding to the position specified by the first output to the host only if the type of touch device indicated by the second output agrees with the type of touch device specified by the command.

22. The controller set forth in claim 21, wherein:
  the command specifies only one touch device type.

23. The controller set forth in claim 21 wherein:
  the command specifies more than one touch device type.

24. The controller set forth in claim 23 wherein:
  when the command specifies more than one touch device type and there are simultaneous touches from touch devices having different types, the processor outputs digital coordinates from only one of the touch devices.

25. The controller set forth in claim 24 wherein:
  output of the digital coordinates with simultaneous touches is determined by a priority among the touch devices.

26. The controller set forth in claim 25 wherein:

the processor ignores cessation of touches from the touch device having priority for a predetermined period of time.

27. The controller set forth in claim 26 wherein:

the processor sets the predetermined period of time in response to a command specifying the period of time from the application program.

28. The controller set forth in claim 21 wherein:

a touch device belonging to at least one of the types generates a signal; and the touchscreen produces the second output in response to the signal.

29. The controller set forth in claim 28 wherein:

a touch device belonging to another of the types does not generate the signal; and the touchscreen produces the second output in response to the lack of the signal.

30. A computer-readable storage device, the storage device being characterized in that:

the storage device contains code which, when executed, implements the processor of claim 21.

\* \* \* \* \*